United States Patent [19]  
Tamai et al.

[11] 4,265,931  
[45] May 5, 1981

[54] PROCESS FOR THE PRODUCTION OF A MAGNETIC RECORDING MEMBER

[75] Inventors: Yasuo Tamai; Hiroshi Ogawa, both of Odawara, Japan

[73] Assignee: Fuji Photo Film Co., Ltd., Minami-ashigara, Japan

[21] Appl. No.: 74,029

[22] Filed: Sep. 10, 1979

Related U.S. Application Data

[63] Continuation of Ser. No. 903,333, May 5, 1978, abandoned, which is a continuation of Ser. No. 816,067, Jul. 15, 1977, abandoned, which is a continuation of Ser. No. 626,690, Oct. 29, 1975, abandoned.

[30] Foreign Application Priority Data

Oct. 29, 1974 [JP] Japan .............................. 49-125196

[51] Int. Cl.³ .............................................. B05D 3/14
[52] U.S. Cl. ..................................... 427/48; 427/130; 427/131
[58] Field of Search .............................. 427/127–132, 427/48, 335, 336, 322, 307

[56] References Cited

U.S. PATENT DOCUMENTS 3,761,311   9/1973   Perrington et al. .................. 117/239

Primary Examiner—Bernard D. Pianalto
Attorney, Agent, or Firm—Sughrue, Rothwell, Mion, Zinn and Macpeak

[57] ABSTRACT

A process for producing a magnetic recording member comprising a non-magnetic support and a magnetic layer comprising at least two layers on the non-magnetic support which comprises the steps of:

(A) providing the lower magnetic layer on the non-magnetic support;
(B) bringing the lower magnetic layer into contact with an organic solvent incapable of dissolving the lower magnetic layer; and
(C) providing the upper magnetic layer on the lower magnetic layer by coating thereon a magnetic coating composition, preferably containing the above organic solvent or a binder soluble in the above organic solvent.

8 Claims, No Drawings

PROCESS FOR THE PRODUCTION OF A MAGNETIC RECORDING MEMBER

This is a Continuation Application of Ser. No. 903,333, filed May 5, 1978, in turn a Continuation Application of Ser. No. 816,067, filed July 15, 1977, in turn a Continuation Application of Ser. No. 626,690, filed Oct. 29, 1975, now abandoned.

BACKGROUND OF THE INVENTION

1. Field of the Invention

The present invention relates to a process for the production of a magnetic recording member. More particularly, the present invention is concerned with an improved method of coating magnetic compositions.

2. Description of the Prior Art

In general, a magnetic recording member is produced by providing a magnetic layer on a flexible or hard non-magnetic support. For example, in producing a magnetic tape, etc., a magnetic coating composition containing a mixture of a magnetic powder and a binder is coated on the support in layer form to provide the magnetic layer. The magnetic layer is usually in monolayer form, not in multi-layer form.

However, in order to produce magnetic tapes particularly suitable for recording signals of short wave length and high performance tapes in which uniform output is required over a wide frequency range, magnetic recording members carrying magnetic layers of various multi-layer constructions have been proposed. U.S. Pat. Nos. 2,691,072, 2,643,130, 2,941,901, Japanese Patent Publications 2218/1962, 5351/1965, U.S. Pat. No. 3,761,311, Japanese Patent Laid Open No. 31907/1973, etc., describe such multi-layer constructions for obtaining uniform output.

U.S. Pat. No. 2,647,954 describes a magnetic recording member in which coercive force is continuously changed in the thickness direction for the purpose of obtaining the same effect as above.

Japanese Patent Publication 8106/1964, U.S. Pat. No. 3,416,949, etc., describe methods of producing magnetic layers free from defects by providing them as a multi-layer construction.

In Japanese Patent Publication 23678/1964 and Japanese Patent Laid Open 18508/1972, the mechanical properties of tapes are taken into account. In U.S. Pat. Nos. 3,676,217, 2,941,901, Japanese Patents Laid Open 81093/1973, 37903/1972, etc., head abrasion characteristics and contact conditions between recording heads and a tape are taken into account.

Japanese Patent Publication 185/1968, U.S. Pat. No. 3,328,195, etc., disclose the use of such multi-layer recording members for multiple recordings.

Japanese Patent Publication 28681/1973, Japanese Utility Model Publication 19135/1959, etc., describe that properties such as the S/N ratio, etc., are improved by employing multi-layer constructions.

Japanese Patent Laid Open 98803/1973 discloses a method of simultaneously providing a plurality of layers, that is, in accordance with this method multi-layers are simultaneously coated so that modulation noise due to any unevenness between two layers, which is liable to be formed by providing the layers separately (i.e., after the lower layer is coated and dried, the upper layer is coated) is reduced.

As a result of the inventors' investigations on these methods, it has now been found that even if complicated processes of placing one magnetic layer on top of another are employed, good effects are not necessarily obtained. In particular, in the method of separately providing two layers, the surface properties of the upper layer (upper magnetic layer) are liable to deteriorate, and a decrease in magnetic properties, particularly the squareness ratio (Br/Bm) of the upper layer, and an increase in noise are observed. These undesirable phenomena are especially shown when the lower magnetic layer is thicker than the upper magnetic layer.

The method of simultaneously providing the layers somewhat reduces modulation noise due to unevenness formed between the layers. With this method, however, problems still occur in that coating heads are complicated, it is impossible to change the direction of the orientation of the magnetic substances in the upper layer and the lower layer (lower magnetic layer), and it is desired that the magnetic coating composition for the upper layer and the magnetic coating composition for the lower layer have comparatively similar properties, etc.

SUMMARY OF THE INVENTION

One object of the present invention is to provide a novel method of producing a magnetic recording member.

Another object of the present invention is to provide an improved method of coating a magnetic coating composition.

A further object of the present invention is to provide a magnetic recording member carrying a magnetic layer of multi-layer construction.

Still another object of the present invention is to provide a magnetic recording member carrying a magnetic layer of multi-layer construction which is low in noise.

A still further object of the present invention is to provide a process for the production of a magnetic recording member having a smooth surface.

The present invention provides a process for the production of a magnetic recording member comprising a non-magnetic support and a magnetic layer comprising at least two layers on the non-magnetic support which comprises:

(A) providing a lower magnetic layer on the non-magnetic support;

(B) bringing the lower magnetic layer into contact with an organic solvent incapable of dissolving the lower magnetic layer; and (C) providing an upper magnetic layer on the lower magnetic layer by coating a magnetic coating composition thereon. The magnetic coating composition preferably contains the above organic solvent or a binder soluble in the above organic solvent.

Step (B) is preferably carried out after the lower magnetic layer has been dried.

DETAILED DESCRIPTION OF THE INVENTION

The method of the present invention enables one to produce a magnetic recording member having excellent characteristics. That is, the present invention is concerned with a method of providing two or more layers separately or individually, i.e., both layers are not simultaneously formed, but it is advantageous in that modulation noise due to unevenness formed between the layers of the magnetic member obtained is small.

Furthermore, in the magnetic recording member produced by the method of the present invention, the direction of the orientation of the magnetic substances for the upper layer and the lower layer can be freely selected.

The magnetic recording member of the present invention has a smooth surface and permits excellent contact with a magnetic head, and thus is suitable not only for audio recording but also for video recording.

It is not completely clear why the method of the present invention is so effective. It is believed, however, that if the lower layer is in the wet or swollen state (where the surface of the lower layer is wetted by a solvent or fine pores present in the lower layer are filled with solvent, or the lower layer contains a solvent but is not dissolved in the solvent; in this state, the lower layer is not solved but the surface of the lower layer is wet and each pore therein is filled with the solvent, or the binder is not solved but swollen), even if the magnetic coating composition for the upper layer is coated on the lower layer, no transfer of solvent from the magnetic coating composition for the upper layer into the lower layer results.

It can be concluded, therefore, that the upper layer, after coating maintains its fluidity until the drying step. (In general, a magnetic coating composition is liable to exhibit thioxotropy because magnetic substances are generally needle-like, and this tendency becomes marked with decreasing amounts of solvent in the magnetic coating composition.) Thus, it can be considered that it becomes easy to orient the ferromagnetic particles in a magnetic field before drying.

Furthermore, it can be concluded that no agglomeration of magnetic substance in the upper layer results before drying because there is no loss of solvent due to a too rapid, vigorous penetration of solvent from the upper layer to the lower layer. As a matter of fact, it has been observed that when the magnetic layer (upper layer) is placed on a dry lower layer, the lower layer rapidly absorbs solvent from the upper layer coating composition, as a result of which the upper layer immediately loses fluidity.

In the magnetic recording member of the present invention, it is sufficient to add a lubricant, such as a silicone oil, merely to the upper layer. It is believed that such a material which provides lubricity, e.g., a silicone oil, etc., gradually oozes from the surface of the layer thereby exhibiting its effect. If the upper layer is coated on the lower layer which the lower layer is in the dry state, as in the prior art, it is seen that the material which provides lubricity transfers into the lower layer as the solvent is transferred into the lower layer. Thus, it can be seen that the step of contacting the lower layer with an organic solvent is effective to prevent this penetration.

In the present invention, binders used in the upper layer and the lower layer are selected in combination with solvents used. These combinations are described below.

(a) Thermosetting binders are used for the lower layer:

If the binder for the lower layer is of the curing type, and the lower layer is cured to some extent, the binder, solvent, and the like in the magnetic coating composition for the upper layer are not restricted. That is, in this case, as the solvent to be contacted with the lower layer and the solvent used in the magnetic coating composition for the upper layer, ketones such as acetone, methyl ethyl ketone, methyl isobutyl ketone, cyclohexanone, and the like; alcohols such as methanol, ethanol, propanol, butanol, and the like; esters such as methyl acetate, ethyl acetate, butyl acetate, ethyl lactate, glycol acetate monoethyl ether, and the like; aromatic hydrocarbons such as benzene, toluene, xylene, and the like; chlorinated hydrocarbons such as methylene chloride, ethylene chloride, carbon tetrachloride, chloroform, ethylenechlorohydrin, dichlorobenzene, and the like; etc., can be used.

Solvents which have a high dissolving power, such as glycol ethers, e.g., glycol monoethyl ether, alkyl sulfoxides, e.g., dimethyl sulfoxide, tetrahydrofuran, and the like, and mixtures thereof can also be used unless they break the cured lower layer (the lower layer is torn by extreme swelling).

Of course, the solvent contained in the magnetic coating composition for the lower layer is not restricted in any fashion, that is, the above described solvents (including the strong solvents) can be used.

The following test can be used in general to determine preferred solvents. The support coated with the lower magnetic layer is immersed in the magnetic coating solvent for the upper layer or the surface of the lower magnetic layer is rubbed with a gauze pad containing the solvent for the upper magnetic layer. A solvent which solves the lower magnetic layer or tears or destroys the same cannot be used.

As the binder for the upper layer, any curing type resin or thermoplastic resins can be used.

(b) Thermoplastic binders are used for the lower layer:

Where thermoplastic binders are used for the lower layer, those solvents contained in the magnetic coating composition for the upper layer are limited. That is, thermoplastic binders are comparatively easily soluble as compared with heat-cured binders. For this reason, the solvents contained in the magnetic coating composition for the upper layer should not dissolve or break the lower layer. The solvent used for the upper layer when the lower layer comprises a thermoplastic binder should be determined taking into acount the thermoplastic binder used for the lower layer. Preferable examples for this case include aromatic hydrocarbons such as toluene, xylene, ketones such as acetone, methylethyl ketone, methyl isobutyl ketone, cyclohexanone, acetate esters such as ethyl acetate, butyl acetate, etc., an the organic solvent used for Step (B). They are easily handled, inexpensive and have preferred solubilities. In addition, the organic solvent used for Step (B) is preferred to solve the binder for the upper magnetic layer; this is because if the binder for the upper magnetic layer is insoluble in the organic solvent for Step (B), the upper magnetic layer cannot easily be uniformly coated as the coating solution sometimes coagulates.

Suitable combinations of binders and solvents are shown in Table 1. From the viewpoint of process ease, the organic solvent for the upper magnetic layer should be the same as was used for Step (B).

TABLE 1

| Binder for the Lower Layer | Examples of Suitable Solvents for the Upper Layer | Examples of Unsuitable Solvents for the Upper Layer |
|---|---|---|
| Nitrocellulose | Toluene, xylene, tetrachloroethane, isopropanol, solvent | Acetone, methyl ethyl ketone, butyl acetate, methanol |

TABLE 1-continued

| Binder for the Lower Layer | Examples of Suitable Solvents for the Upper Layer | Examples of Unsuitable Solvents for the Upper Layer |
| --- | --- | --- |
| | naphtha | |
| Cellulose acetate butyrate (26 wt % acetyl groups, 14 wt % butyl groups) | Cyclohexane, toluene, solvent naphtha, isopropyl alcohol, methanol | Butyl acetate, phenol, tetrachloroethane, acetone, cyclohexane |
| Polyvinyl formal | Toluene, xylene, methyl ethyl ketone, cyclohexanone, butyl acetate | Tetrachloroethane, chloroform, ethylene chloride, dioxane |
| Vinyl chloride-vinyl acetate copolymer (80:20 mol % copolymerization ratio) | Cyclohexane, chloroform, isopropanol, methanol | Acetone, butyl acetate, tetrachloroethane, tetrahydrofuran |
| Polymethyl methacrylate | Carbon tetrachloride, xylene solvent naphtha, isopropanol, cyclohexanone | Tetrachloroethane, chloroform, acetone, ethylene chloride |
| Polyvinyl chloride | Butyl acetate, toluene, xylene, isopropanol | Cyclohexanone, tetrahydrofuran, nitrobenzene, dimethyl formamide |
| Polyvinylidene chloride | Cycloxane, chloroform, methyl acetate, isopropanol, solvent naphtha | Methyl ethyl ketone, cyclohexanone, tetrahydrofuran |
| Polyvinyl acetate | Cyclohexane, toluene, solvent naphtha, isopropanol | Chloroform, methyl ethyl ketone, ethyl acetate, ethylene chloride |

The combinations of binders for the upper layer and lower layer are as follows:
upper layer: thermoplastic binder and/or thermosetting binder,
lower layer: thermosetting binder containing from 0 to about 40 wt% of thermoplastic binder.

Three preferred combination of binders for the upper layer and lower layer are as follows.
  (i) upper layer: thermosetting binder (100 wt%)
     lower layer: thermosetting binder (100 wt%)
  (ii) upper layer: thermoplastic binder (100 wt%)
     lower layer: thermosetting binder (100 wt%)
  (iii) upper layer: thermosetting-thermoplastic (1/9–9/1 weight ratio)binder
     lower layer: thermosetting binder As the binders for the upper layer and the lower layer, any hitherto well known thermoplastic resins, thermosetting resins, and mixtures thereof can be used.

The thermosetting resin (which includes reactive type resins, though this latter term generally implies a lower molecular weight) has a molecular weight of about 200,000 or less in the coating solution, but when heated after coating and drying, the molecular weight essentially becomes infinite due to reactions such as condensation, addition, and the like. Of these resins, preferred resins are resins which do not soften or melt before the thermal decomposition thereof. Representative examples of these resins are a phenol resin, an epoxy resin, a polyurethane hardening type resin, a urea resin, a melamine resin, an alkyd resin, a silicone resin, an acrylic based reactive resin, an epoxy-polyamide resin, a mixture of a high molecular weight polyester resin and an isocyanate prepolymer, a mixture of a methacrylic copolymer and a diisocyanate prepolymer, a mixture of a polyester polyol and a polyisocyanate, a urea-formaldehyde resin, a mixture of a low molecular weight glycol, a high molecular weight diol and triphenylmethane triisocyanate, a polyamine resin, mixtures thereof, and the like.

These resins are described in Japanese Patent Publications 8103/1964, 9779/1965, 7192/1966, 8016/1966, 14275/1966, 18179/1967, 12081/1968, 28023/1969, 14501/1970, 24902/1970, 13103/1971, 22065/1972, 22066/1972, 22067/1972, 22072/1972, 22073/1972, 28045/1972, 28048/1972, 28922/1972, U.S. Pat. Nos. 3,144,353, 3,320,090, 2,437,510, 3,597,273, 3,781,210, 3,781,211, etc.

As described above, when a thermoplastic resin is used for the lower layer, it is limited by the solvent used, whereas when a thermoplastic resin is used for the upper layer, it is not limited. The thermoplastic resins can be used in combination with thermosetting resins, if desired.

Suitable thermoplastic resins are those resins which have a softening point of about 150° C. or less, an average molecular weight of about 10,000 to 200,000 and a degree of polymerization of about 200 to 2,000, e.g., a vinyl chloride-vinyl acetate copolymer, a vinyl chloride-vinylidene chloride copolymer, a vinyl chloride-acrylonitrile copolymer, an acrylate-acrylonitrile copolymer, an acrylate-acrylonitrile copolymer, an acrylate-vinylidene chloride copolymer, an acrylate-styrene copolymer, a methacrylate-acrylonitrile copolymer, a methacrylate-vinylidene chloride copolymer, a methacrylate-styrene copolymer, a urethane elastomer, polyvinyl fluoride, a vinylidene chloride-acrylonitrile copolymer, a butadiene acrylonitrile copolymer, a polyamide resin, polyvinyl butyral, cellulose derivatives such as cellulose acetate butyrate, cellulose diacetate, cellulose triacetate, cellulose propionate, nitrocellulose, and the like, a styrene-butadiene copolymer, a polyester resin, a chlorovinyl ether-acrylate copolymer, an amino resin, various synthetic rubber based thermoplastic resins such as polybutadiene, polychloroprene, polyisoprene, styrene-butadiene copolymer, etc., and mixtures thereof, etc. Copolymers, when used, are generally at a 10/1 to 1/10 molar ratio of the recited components.

These resins are described in 6877/1962, 12582/1964, 19282/1964, 5349/1965, 20907/1965, 9463/1966, 14059/1966, 16985/1966, 6428/1967, 11621/1967, 4623/1968, 15206/1968, 2889/1969, 17947/1969, 18232/1969, 14020/1970, 14500/1970, 18573/1972, 22063/1972, 22064/1972, 22068/1972, 22069/1972, 22070/1972, 28776/1972, U.S. Pat. Nos. 3,144,352, 2,419,420, 3,499,789, 3,713,887, etc.

Where the upper layer is composed of a thermoplastic binder, the solvent contacted with the lower layer is selected from the solvents shown in Examples of Suitable solvents for Upper Layer in Table 1. Of course, the solvents and binders shown in Table 1 are merely illustrative. It is most preferred that the ratio of solvent to binder in coating be from about 4 to 15 weight parts of solvent per weight part of binder.

These binders and ferromagnetic powders are mixed and the binder dissolved and the ferromagnetic powder dispersed in an organic solvent, and the resulting dispersion coated on a support for the lower layer and dried to form magnetic layers, whereby magnetic recording members are obtained.

Ferromagnetic fine powders used in the upper layer and the lower layer are conventional and include $\gamma$-Fe$_2$O$_3$, Co-containing $\gamma$-Fe$_2$O$_3$, Fe$_3$O$_4$, Co-containing Fe$_3$O$_4$, a Berthollide compound of magnemite and magnetite (FeO$_x$, $1.33 < X < 1.50$), Berthollide compounds of iron oxides containing divalent metals (Co, Mn, Cr, etc.), CrO$_2$, Co-Ni-P alloys, Co-Ni-Fe alloys, Co-Ni-Fe-B alloys, Fe-Ni-Zn alloys, Fe-Mn-Zn alloys, Fe-Co-Ni-Cr alloys, Fe-Co-Ni-P alloys, Ni-Co alloys, and other known ferromagnetic fine powders.

These ferromagnetic fine powders are described in Japanese Patent Publications 14090/1969, 18372/1970, 22062/1972, 22513/1972, 28466/1971, 38755/1971, 4286/1972, 12422/1972, 17284/1972, 18509/1972, 18573/1972, 10307/1974, 39639/1973, U.S. Pat. Nos. 3,026,215, 3,031,341, 3,100,194, 3,242,005, 3,389,014 British Pat. Nos. 752,659, 782,762, 1,007,323, French Pat. No. 1,107,654, West German Patent Laid Open (OLS) No. 1,281,334, etc.

In the present invention, those magnetic members in which the coercive force of the magnetic substance used in the upper layer is higher than that of the magnetic substance used in the lower layer are suitable for short wave length recording. Preferably, the coercive force of the upper layer is about 1.2 time or more, particularly about 1.35 times or more, that of the lower layer. For example, when the Hc of the lower layer is about 300 to 800 Oe, the Hc of the upper layer is about 350 to 1,500 Oe. Suitable ferromagnetic powders for the upper layer are Co-containing $\gamma$-Fe$_2$O$_3$, Fe$_3$O$_4$, Co-containing Fe$_3$O$_4$, the above described Berthollide compounds and Co, Mn, Cr or like containing Berthollide compounds (e.g., with about 1 to about 20 atomic % Co, about 0.5 to about 10 atomic % Mn, and about 0.5 to about 8 atomic % Cr), CrO$_2$, and various magnetic alloy powders containing 50 wt% or more of at least one ferromagnetic metal from Fe, Co and Ni.

The ferromagnetic fine powder is added in an amount of about 25 to 299 parts by weight, preferably about 30 to 150 parts by weight, per 300 parts by weight of the binder. Their particle size is preferably about 0.2 to 2 microns in length and about 1/1 to 20/1 in length/width ratio.

In the magnetic coating composition there can be incorporated, in addition to the above binder, ferromagnetic powder and solvent, additives such as a dispersing agent, a lubricant, an abrasive agent, an antistatic agent, and the like.

As the dispersing agent, aliphatic acids containing 12 to 18 carbon atoms (R$_1$COOH, where R$_1$ is an alkyl group containing 11 to 17 carbon atoms), such as capric acid, caprylic acid, lauric acid, myristic acid, palmitic acid, stearic acid, oleic acid, olaidic acid, linolic acid, linelenic acid, stearolic acid, and the like; metal soaps comprising an alkali metal (Li, Na, K, etc.) salt or alkaline earth metal (Mg, Ca, Ba, etc.) salt of the above aliphatic acids; lecithin, and the like can be used. In addition, higher alcohols containing about 12 to more carbon atoms, and sulfates thereof, etc., can be used. The dispersing agent, when added, is usually present in an amount of about 0.5 to 20 parts by weight per 100 parts by weight of the binder.

In the present invention, it is not particularly necessary to add lubricants, abrasive agents, or antistatic agents to the lower layer, and if they are used it is sufficient to add them only to the upper layer.

As the lubricant, silicone oil, graphite, molybdenum disulfide, tungusten disulfide, aliphatic acid esters of monobasic aliphatic acids containing 12 to 16 carbon atoms and monohydric alcohols containing 3 to 12 carbon atoms, aliphatic acid esters of monobasic aliphatic acids containing 17 or more carbon atoms and monohydric alcohols whose carbon atom number, when combined with that of the monobasic aliphatic acid, totals 21 to 23, and the like can be used. The lubricant when added is usually added in an amount of about 0.2 to 20 parts by weight per 100 parts by weight of the binder.

These lubricants are described in Japanese Patent Publication 23889/1968, Japanese Patent Applications 28647/1967, 81543/1968, U.S. Pat. Nos. 3,470,021, 3,492,235, 3,497,411, 3,523,086, 3,625,760, 3,630,772, 3,634,253, 3,642,539, 3,687,725, *IBM Technical Disclosure Bulletin*, Vol. 9, No. 7, page 779 (December, 1966), *ELECTRONIK*, No. 12, page 380 (1961), etc.

As the abrasive agent, fused alumina, silicon carbide, chromium oxide, corundum, synthetic corundum, diamond, synthetic diamond, garnet, emery (major component: corundum and magnetite), and the like can be used. The abrasive agent, when added, is usually present in an amount of about 0.5 to 20 parts by weight per 100 parts by weight of the binder.

Abrasive agents having an average particle diameter of about 0.05 to 5$\mu$, preferably about 0.1 to 2$\mu$, are generally used.

These abrasive agents are described in Japanese Patent Publication 26749/1973, U.S. Pat. Nos. 3,007,807, 3,041,196, 3,293,066, 3,630,910, 3,687,725, British Pat. No. 1,145,349, West German Pat. No. 853,211, etc.

Antistatic agents which can be used in the present invention include inorganic materials such as carbon black and organic materials, for example, natural surface active agents such as saponin; nonionic surface active agents such as alkylene oxide based-, glycerin based-, glycidol based-surface active agents, and the like; cationic surface active agents such as heterocyclic compounds, e.g., higher alkylamines, quaternary ammonium salts, pyridine, and the like, phosphoniums, sulfoniums, and the like; anionic surface active agents containing acid groups such as carboxylic acid groups, sulfonic acid groups, phosphoric acid groups, sulfate groups, phosphate groups, and the like; amphoteric surface active agents such as sulfates or phosphates of amino acids, amino sulfuric acids, and amino alcohols, and the like; etc. A suitable amount of the inorganic material is about 5% by weight and of the organic material is about 0.5 to 1% by weight, each based on the weight of the ferromagnetic material.

Examples of the surface active agents that can be used as antistatic agents are described in U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174, 3,545,974, West German Patent Application (OLS) No. 1,942,665, British Pat. Nos. 1,077,317, 1,198,450, Ryohei Oda, et al, *Kaimen Kassei Zai no Gosei to so no Oyo* (*Synthesis of Surface Active Agents and Their Applications*), Maki Shoten, Tokyo (1964), A.M. Schwartz et al *Surface Active Agents*, Interscience Publications Corp. (1958), J.P. Sisley et al. *Encyclopedia of Surface Active Agents,* Vol. 2, Chemical Publishing Co. (1964), *Kaimen Kassei Zai Binran* (*Handbook of Surface Active Agents*), 6th Ed., Sangyo Tosho Co., December 20, 1966, etc.

These surface active agents can be used alone or in combination with each other. Although these surface active agents are used as antistatic agents, they can be used for other purposes, for example, for improving dispersibility, magnetic properties, lubricity, or as auxiliary coating agents.

The lower magnetic recording layer is formed by dissolving/dispersing the desired components in an organic solvent to produce a coating dispersion and coating the same on a support. The upper magnetic recording layer is formed by coating and drying after coating and preferably drying the lower layer.

The thickness of the support is conventional. Usually it is about 5 to 50 $\mu$m, preferably about 10 to 40 $\mu$m. The support can be made of standard materials including polyesters such as polyethylene terephthalate, polyethylene-2,6-naphthalate, and the like, polyolefins such as polypropylene and the like, cellulose derivatives such as cellulose triacetate, cellulose diacetate, and the like, polycarbonates, polyamides, or the like. Preferred supports are polyethylene terephthalate, polyethylene-2,6-naphthalate and cellulose triacetate.

With the above support, the side opposite the magnetic layers can be provided with a back-coating for the purpose of preventing static discharge, print-through, and the like. Useful back-coatings are described in U.S. Pat. No. 2,804,401, 3,293,066, 3,617,378, 3,062,676, 3,734,772, 3,476,596, 2,643,048, 2,803,556, 2,887,462, 2,923,642, 2,997,451, 3,007,892, 3,041,196, 3,115,420, 3,166,688, etc.

The support can be in any shape, depending on the end use, e.g., tape, sheet, card, disc, drum, and the like. In producing the support, a suitable material is selected for the desired form of the support using conventional criteria.

The magnetic layers are provided on the support by conventional means, e.g., air doctor coating, blade coating, air knife coating, squeeze coating, dip coating, reverse roll coating, transfer roll coating, gravure coating, kiss coating, cast coating, spray coating, or the like. Of course, other coating methods can be used, and these methods are described in detail in *Coating Kagaku* (*Coating Engineering*), pages 253 to 277, Asakura Shoten, Tokyo (March 20, 1971).

The magnetic substance in the lower magnetic layer coated on the support above is, if desired, oriented and then dried. Further, surface smoothening processing, heating processing, and the like are applied, whereby the lower layer is obtained.

In one preferred processing in accordance with the present invention, the upper layer is provided on the lower layer after, coating, curing, drying and surface smoothing of the lower layer, for example, by supercalendering the lower layer has been completed. Curing of the lower layer is generally conducted at temperatures of from about 15 to about 70° C., at atmospheric pressure and by storing the layer immediately after coating for up to 60 days. Further, in accordance with this invention, a three or more layer structure can be provided by using a thermosetting resin as a binder. However, this is not desirable since such thin layer coating is difficult and expensive. Furthermore, an intermediate layer (not magnetic) recording layer) may be provided between the lower layer and the upper layer. Such an intermediate layer is disclosed in Japanese Utility Model Publication 18135/1959 and Japanese Patent Application (OPI) 111605/1974.

The lower layer is then brought in contact with an organic solvent which does not dissolve the lower layer. As the method of contacting the lower layer with the solvent, the above described coating methods can be used. In addition, a vapor deposition-coagulation method (see Japanese Patent Publication 13454/1973) as is well known in the field of electrophotography can be used.

While not limiting, the above contact is preferably at the following conditions: pressure: 0.8 to 2 atm, temperature: −40° to 50° C.; and time: 0.001 to 10 sec., most preferably 0.05 to 3 sec.

The excess solvent adhering to the surface of the lower layer is removed with an air knife or the like. The upper layer is then coated on the lower layer so formed. As the method of coating the upper layer, any of the above described coating methods can be used.

It is preferred that the solvent be present in the lower layer in an amount of about 15 to 120% by weight based on the lower layer dry weight. Below the lower limit the effect of the present invention is not obtained, whereas above the upper limit, the drying load is very large.

The magnetic substance present in the upper magnetic layer provided on the lower layer can be subjected to magnetic field-orientation in the desired direction, if desired. The thus formed magnetic layer is then dried. Conditions used can be as for the lower layer for both these steps.

In the present invention, the drying load is somewhat increased as it is necessary to dry the solvent of the upper layer and the solvent brought into contact with the lower layer and contained in the lower layer. The upper layer is then, as desired subjected to surface smoothening processing, heating processing, and the like, using the conditions, etc., as described for the lower layer, whereby the upper layer is provided on the lower layer. The member so produced is cut into the desired form, and thus the magnetic member of the present invention is obtained.

In the above orienting treatments for the magnetic layers, the orienting magnetic field can be either an AC or DC magnetic field with a field strength of about 500 to 2,000 gauss. In the above, the drying conditions for the magnetic layers are from about 50° to 130° C., preferably 70° to 110° C., more preferably 80° to 90° C., using about 1 to 5 Kl/m$^2$, preferably 2 to 3 Kl/m$^2$, of air, over a period of about 30 seconds to 10 minutes, preferably 1 to 5 minutes.

In the surface-smoothening treatment of the magnetic layers, preferably a calendering method is used in which the magnetic layer is passed between a metal roll and a non-metallic roll while the layer is heated under pressure. A combination of a metal roll and a roll made of cotton and a combination of a metal roll and a roll made of a synthetic resin are especially preferred. The pressure used in this treatment is about 25 to 500 Kg/cm, and the surface temperature of the metal roll is kept at about 35° to 150° C. The rate of the treatment is about 5 to 120 meters/min. When the pressure and temperature are below the lower limits of the above-specified ranges, the effect of the surface-smoothing treatment is difficult to achieve. Pressures and temperatures higher than the upper limits of the above specified ranges are not preferred because the support of the magnetic recording material is deformed. When the treating rate is less than about 5 meters/min. the operating efficiency is low, and if the rate is above about 120 meters/min., operation is difficult.

The most preferred process for the production of a magnetic recording medium disclosed above is the process disclosed in Japanese Patent Application (OPI) 41506/1975 (corresponding to U.S. Patent application Ser. No. 498,337, filed on Aug. 19, 1974).

These methods are described in Japanese Patent Publications 28368/1964, 23625/1965, U.S. Pat. No. 3,473,960, etc. The method described in Japanese Patent Publication 13181/1966 is considered a fundamental technique in this field.

In the present invention, it is preferred that the lower layer be about 3 to 20 μm in dry thickness, and the upper layer be about 0.5 to 6 μm, preferably about 0.8 to 3 μm, in dry thickness. As necessary, a layer for increasing the adhesion between the support and the lower layer can be provided between the support and the lower layer. If the lower layer is directly provided on the support, occasionally the lower layer may peel from the support when curing is completed; therefore a conventional adhesion layer may be required, depending on the combination of the support and a binder of the lower layer. The need for such and the selection of an appropriate adhesive will be obvious to one skilled in the art.

The magnetic recording member of the present invention has a very smooth surface and good magnetic reproduction performance. Furthermore, the magnetic recording member is characterized by low modulation noise, irrespective of the fact that the magnetic recording member has been produced by the separate formation of two layers.

The present invention will now be illustrated in detail by an example. It will be understood by one skilled in the art that the components, ratios, operational orders, etc., shown in this example can be changed without departing from the spirit of the present invention, i.e., the present invention is not to be limited by the example, where all parts are by weight unless otherwise indicated.

EXAMPLE (1) Production of Magnetic coating composition (Thermosetting Coating Solution A)

The following ingredients were changed to a ball mill and kneaded.

| | Parts |
| --- | --- |
| $\gamma$-Fe$_2$O$_3$ (0.4 μm in length and 6/1 acicular ratio saturation magnetization ($\delta s$): 52 emu/g | 300 |
| Vinyl Chloride-Vinyl Acetate-Vinyl Alcohol Copolymer (copolymerization molar ratio = 87:11:2 molecular weight = 420) | 30 |
| Polyester Polyol (condensate of adipic acid and butanediol, having 4% terminal hydroxyl groups, and a molecular weight of about 1800) | 25 |
| Toluene | 225 |
| Methyl Isobutyl Ketone | 525 |

20 parts of Desmodur L-75 as a hardener (trade name, produced by Bayer A. G., polyisocyanate compound; adduct of 3 moles of toluene diisocyanate and 1 mole of trimethylol propane; m.w., ca. 560) were then added and the system uniformly dispersed to form a magnetic coating composition. This coating composition was designated Magnetic Coating Composition A.

Magnetic Coating Composition A was coated on a 20 μm thick polyethylene terephthalate film while applying a magnetic field (for orientation; 2000 Oe D.C. magnetic field; 0.1 sec.), and dried (100° C.; 3 Kl/m$^2$ of air blown thereon; time 5 min.). The dry thickness of the resulting layer was 6 μm.

This magnetic layer had a 325 Oe coercive force and a 0.80 squareness ratio (Br/Bm) measured in a magnetic field of 3,000 Oe and 50 Hz (hereafter measured under the same conditions)

(2) Production of Magnetic Coating Composition (Thermosetting Coating Solution B)

The following ingredients were charged to a ball mill and kneaded.

| | Parts |
| --- | --- |
| Chromium Dioxide (0.5 μm in length and 6/1 acicular ratio) saturation magnetization ($\delta s$): 87 emu/g) | 300 |
| Vinyl Chloride-Vinylidene Chloride Copolymer (copolymerization molar ratio = 7:3, degree of polymerization = 400) | 27 |
| Epoxy Resin (hydroxy group content: 0.16%) | 28 |
| Silicone Oil (dimethyl polysiloxane) | 3 |
| Butyl Acetate | 700 |

14 parts of Desmodur L-75 (trade name of a polyisocyanate compound produced by Bayer A. G.) as a hardener were then added and the system mixed to form a magnetic coating composition. This magnetic coating composition was designated Magnetic Coating Composition B.

Magnetic Coating Composition B was coated on a 20 μm thick polyethylene terephthalate film while applying a magnetic field (orientation; as in (1)), and dried (as in (1)). The dry thickness of the magnetic layer was 6 μm.

This magnetic layer had a 510 Oe coercive force (Hc) and a 0.91 sqareness ratio (Br/Bm).

(3) Production of Magnetic Coating Composition (Thermoplastic Coating Solution C)

The following ingredients were charged to a ball mill and kneaded.

| | Parts |
| --- | --- |
| $\gamma$-Fe$_2$O$_3$ (0.55 μm in length and 6/1 acicular ratio; saturation magnetization ($\delta s$): 49 emu/g) | 300 |
| Polyvinyl Chloride (molecular weight: 32,000) | 65 |
| Glycidyl Epoxided Stearic Acid | 6 |
| Cyclohexanone | 500 |
| Tetrahydrofuran | 200 |

This magnetic coating composition was designated Magnetic Coating Composition C. Magnetic Coating Composition C was coated on a 20 μm thick polyethylene terephthalate film while applying a magnetic field (orientation; as in (1)), and dried (as in (1)). The magnetic layer had a 290 Oe coercive force (Hc) and a 0.73 squareness ratio (Br/Bm).

(4) Production of Magnetic Coating Composition (Thermosetting Coating Solution D)

The following ingredients were charged to a ball mill and kneaded.

| | Parts |
|---|---|
| Alloy Magnetic Powder (Fe:Co:Cr = 70:28:2% by weight; average particle size: 0.2 $\mu$m × 0.03 $\mu$m; saturation magnetization ($\delta$s): 89 emu/g) | 300 |
| Cellulose Acetate Butyrate (commercial name: EAB-381, produced by Eastman Kodak Co., Ltd. containing 13 wt % acetyl groups and 37 wt % butyl groups) | 40 |
| Silicone Oil (dimethyl polysiloxane) | 3 |
| Aluminum Oxide (Al$_2$O$_3$, average particle size = 0.2 $\mu$m) | 10 |
| Butyl Acetate | 500 |
| Toluene | 200 |

20 parts of Desmodur L-75 as a hardener were then added and the system dispersed. This magnetic paint was designated Magnetic Coating Composition D.

Magnetic Coating Composition D was coated on a polyethylene terephthalate film while applying a magnetic field (orientation; as in (1)), and dried (as in (1)). The dry thickness was 3 $\mu$m.

The magnetic layer had a 920 Oe coercive force (Hc) and a 0.81 squareness ratio (Br/Bm).

The above Samples based upon the indicated magnetic coating compositions were single layer Samples for purposes of comparison. The above magnetic coating composition were then used to prepare multi-layer magnetic recording members according to the following regimen.

(5) Production of Multi-layer Magnetic Recording Member

Magnetic recording members were produced using the layer constructions and the wetting solvents shown in Table 2.

In each case, a 20$\mu$ thick polyethylene terephthalate film was used as the support.

The lower layer was initially provided on the support, i.e., the predetermined magnetic coating compound shown in Table 2 was coated on the support and subjected to magnetic field orientation as described for the respective "single layer" materials earlier formed (noting Thermosetting Coating Solution D is only used for the upper layer) so that the ferromagnetic particles therein were oriented in the lengthwise direction, and then dried as described in (1)-(4). At this stage, the "product" was identical to the earlier "comparison" materials. The surface of the magnetic layer was subjected to super calendering at 200 Kg/cm using a chromium electroplated iron roll at 90° C. at a pass rate of 50 meters/min; the intermediate product was then stored in a thermostatic chamber at 60° C. for one night and one day. By such processing, Thermosetting Solutions A and B were cured.

In Samples #1 to #3, prior to the provision of the upper layer, the lower layer was wetted with the Wetting Solvent as identified in Table 2, which is a feature of the present invention. All of the magnetic layers of Samples #1 to #3 were contacted with the solvents shown in Table 2. In Samples #4 and #5, the coating solutions for the upper layer were coated directly on the lower layer without contacting the lower layer with any solvent. In Samples #1 to #3, the magnetic coating compositon for the upper layers were coated after wetting the lower layers. The direction of the magnetic field orientation was the lengthwise direction as in the lower layer. After coating, the surface was dried (110° C.; 3 Kl/m$^2$ of air blown thereon, time=6 minutes), super calendered as for the lower layer, and the member was slit into $\frac{1}{2}$ inch width tapes.

Various properties of the tapes produced using Samples #1 to #5 were compared and are shown in Table 3.

TABLE 3

| Sample No. | Coercive Force Hc (Oe) | Squareness Ratio Br/Bm | Modulation Noise (dB) *1 | Video Output (dB) *2 | Surface Properties *3 |
|---|---|---|---|---|---|
| #1 | 345 | 0.87 | −1.4 | 1.1 | Highly Smooth |
| #2 | 590 | 0.87 | −0.2 | 2.8 | Smooth |
| #3 | 352 | 0.86 | −1.7 | 1.4 | Highly Smooth |
| #4 | 341 | 0.85 | −0.0 | 0.0 | Agglomerates were detected. |
| #5 | 569 | 0.83 | 2.4 | 0.5 | Agglomerates were detected. |

*1 Modulation noise at 4.5 MHz. Measured with Sample #4 as a standard
*2 Video out-put at 5 MHz. Measured with Sample #4 as a standard
*3 Visually Measured

TABLE 2

| Sample No. | Lower Magnetic Layer | Thickness ($\mu$m) | Wetting Solvent | Solvent Retained in Lower Magnetic Layer (*) (wt %) | Upper Magnetic Layer | Thickness ($\mu$m) |
|---|---|---|---|---|---|---|
| #1 | Thermosetting Coating Solution A | 4.8 | Toluene | 35 | Thermosetting Coating Solution B | 1.6 |
| #2 | Thermosetting Coating Solution B | 4.2 | Methyl Ethyl | 45 | Thermosetting Coating Solution D | 1.3 |
| #3 | Thermoplastic Coating Solution C | 5.0 | n-Butyl Acetate | 52 | Thermosetting Coating Solution B | 1.8 |
| #4 | Thermosetting Coating Solution A | 4.8 | — | — | Thermosetting Coating Solution B | 1.6 |
| #5 | Thermosetting Coating Solution B | 4.2 | — | — | Thermosetting Coating Solution D | 1.3 |

As can be understood from the results, the multi-layer magnetic recofding member of the present invention is characterized by a smooth surface, high output, and low noise. As can be understood from the Hc and Br/Bm results, the magnetic recording member of the present invention is higher in these items, which shows high orientation of the magnetic substance in the upper layer.

While the invention has been described in detail and with reference to specific embodiments thereof, it will be apparent to one skilled in the art that various changes and modifications can be made therein without departing from the spirit and scope thereof.

What is claimed is:

1. A process for producing a magnetic recording medium comprising a non-magnetic support and two magnetic layers which comprise a ferromagnetic powder and a binder, one magnetic layer being a lower magnetic layer about 3 to 20 um in thickness and being coated on said non-magnetic support and the other magnetic layer being an upper magnetic layer coated on said lower magnetic layer, said upper magnetic layer being 0.5 to 6 um in thickness and being thinner than the lower magnetic layer, the upper magnetic layer containing ferromagnetic powder having a coercive force at least 1.2 times higher than the coercive force of the ferromagnetic powder in the lower magnetic layer; which process comprises the sequential, separate and distinct steps of:

(A) forming the lower magnetic layer on said support by coating a lower magnetic coating composition having a binder component which is a thermosetting resin on said non-magnetic support, orienting the ferromagnetic powders in said lower magnetic coating composition during coating, drying the composition and calendering the dried composition;

(B) contacting said lower magnetic layer with an organic solvent incapable of dissolving said lower magnetic layer such that the amount of said solvent present in the lower layer as the result of said contact is 15 to 120% by weight based on the total dry weight of the lower layer so that the lower layer is not solved but the surface of the lower layer is wet and each pore therein is filled with the solvent, or the binder of the lower layer is not solved but swollen;

(C) forming an upper magnetic layer on said lower layer by coating an upper magnetic coating composition on said lower magnetic layer, and drying said upper composition containing the organic solvent of step (B), a binder soluble in said organic solvent which is selected from the group of resins consisting of thermoplastics resins, thermosetting resins and mixtures thereof, and a lubricant.

2. The process of claim 1 wherein the binder component of said lower magnetic coating composition contains 0 to about 40% thermoplastic resin and the balance thermosetting resin and wherein said step (C) comprises orienting the ferromagnetic particles in said upper coating composition with a magnetic field during coating and thereafter drying and then surface smoothening by a calender treatment.

3. The process of claim 2, wherein the binder component of said upper layer consists of thermoplastic binder and/or thermosetting binder and the binder component of said lower layer is a thermosetting binder containing 0 to about 40% by weight thermoplastic binder.

4. The process of claim 2, wherein the binder component of said upper layer is thermosetting binder and the binder component of said lower layer is thermosetting binder.

5. The process of claim 2, wherein the binder component of said upper layer is thermoplastic binder and the binder component of said lower layer is thermosetting binder.

6. The process of claim 2, wherein the binder component of said upper layer is thermosetting binder and thermoplastic binder wherein the weight ratio of said thermosetting binder to said thermoplastic binder is 1/9 to 9/1 and the binder component of said lower layer is thermosetting binder.

7. The process of claim 1, wherein the lubricant is added in an amount of about 0.2 to 20 parts by weight per 100 parts by weight of the binder of the upper layer.

8. The process of claim 1, wherein the solvent used in steps (B) and (C) is selected from the group consisting of ketones, alcohol, esters, aromatic hydrocarbons, chlorinated hydrocarbons, glycol ethers, alkyl sulfoxides, tetrahydrofuran and mixtures thereof.

* * * * *